United States Patent [19]

Pollet et al.

[11] Patent Number: 5,312,687

[45] Date of Patent: * May 17, 1994

[54] SIZE COMPOSITION FOR IMPREGNATING FILAMENT STRANDS WITH A LIQUID CRYSTAL POLYMER AND THE STRANDS PRODUCED THEREBY

[75] Inventors: Jean-Claude Pollet; David L. Shipp, both of Granville; Gordon P. Armstrong, Newark; Martin C. Flautt, Granville, all of Ohio

[73] Assignee: Owens-Corning Fiberglas Technology Inc., Summit, Ill.

[*] Notice: The portion of the term of this patent subsequent to Jun. 18, 2008 has been disclaimed.

[21] Appl. No.: 4,039

[22] Filed: Jan. 15, 1993

Related U.S. Application Data

[63] Continuation of Ser. No. 582,735, Sep. 14, 1990, abandoned, which is a continuation of Ser. No. 360,622, Jun. 2, 1989, abandoned, which is a continuation of Ser. No. 24,947, Mar. 12, 1987, abandoned.

[51] Int. Cl.5 .......................... B32B 9/00; D02G 3/00
[52] U.S. Cl. ...................................... 428/372; 428/378; 428/391; 428/392; 428/396; 428/401; 65/3.43
[58] Field of Search .............. 428/392, 378, 375, 372, 428/401, 396; 65/3.43; 528/193

[56] References Cited

U.S. PATENT DOCUMENTS

| | | | |
|---|---|---|---|
| 4,394,498 | 7/1983 | Kastelic | 528/193 |
| 4,540,737 | 9/1985 | Wissbrun et al. | 524/599 |
| 4,861,515 | 8/1989 | Minamisawa et al. | 252/299.01 |
| 5,024,890 | 6/1991 | Pollet et al. | 428/392 |
| 5,128,198 | 7/1992 | Dyksterhouse et al. | 428/240 |

Primary Examiner—Patrick J. Ryan
Assistant Examiner—J. M. Gray
Attorney, Agent, or Firm—Ted C. Gillespie; Patrick P. Pacella

[57] ABSTRACT

A glass fiber strand impregnated with a liquid crystal polymer and an aqueous slurry composition useful for producing the liquid crystal polymer impregnated glass fiber strand are disclosed. The aqueous slurry composition includes a liquid crystal polymer resin powder and a thickener material. The slurry composition is applied to the glass fiber surfaces during the fiber forming process. Coupling agents, surfactants or lubricants material may optionally be added to the slurry composition. One embodiment of the slurry composition includes a polyethylene oxide binder material and a melt spinnable liquid crystal polyester which is optically anisotropic in the melt phase.

5 Claims, No Drawings

SIZE COMPOSITION FOR IMPREGNATING FILAMENT STRANDS WITH A LIQUID CRYSTAL POLYMER AND THE STRANDS PRODUCED THEREBY

This is a continuation of application Ser. No. 582,735, now abandoned, filed Sep. 14, 1990 which is a continuation of Ser. No. 360,622, now abandoned, filed Jun. 2, 1989 which is a continuation of Ser. No. 024,947 now abandoned, filed Mar. 12, 1987.

TECHNICAL FIELD

This invention relates to a size composition useful for impregnating a highly loaded, impregnated fibrous strand where the impregnation takes place during the fiber forming operation. In one of its more specific aspects, this invention relates to a glass fiber strand impregnated with a liquid crystal polymer.

BACKGROUND OF THE INVENTION

The production of impregnated fibers and the application of thermoplastic resins to the fibers is well-known. Such fibers are coated with the thermoplastic resin after the fiber strand has been formed.

Sizing compositions employed as coatings for glass fibers have conventionally been applied to the surface of the glass fibers after the glass fiber has been formed. Typically, it is necessary to first produce the glass fibers by providing a thin layer of a size composition to the surface of the bare glass fibers. The size composition must be compatible with the glass fiber and the resin which is subsequently applied to the sized fiber. The size composition serves to improve the bonding relationship between the glass fibers and the polymeric or thermoplastic resins. The glass fibers are then collected into a strand and the strand is wound around a take-up bobbin to form a substantially cylindrical package, conventionally termed a "yarn package". The yarn package is then air dried or subjected to elevated temperatures in order to dry the size composition applied to the surface of the glass fibers. The glass fibers are thereafter impregnated with the thermoplastic resin to form an impregnated yarn or cord.

However, it is difficult to produce a liquid crystal polymer impregnated glass fiber strand. Liquid crystal polymers cannot be dissolved in the size composition solvents normally used in producing impregnated fibrous strands. Therefore, the liquid crystal polymer thus cannot be applied to a filament using a solvent impregnation process. In addition, the conventional melt impregnation process cannot be used to produce a glass fiber strand impregnated with a liquid crystal polymer since a specific size composition must be used which does not allow for the production of highly loaded liquid crystal polymer impregnated glass strands having optimum mechanical properties such as high strength.

It would be beneficial if a glass fibrous strand impregnated with a liquid crystal polymer could be produced which would have good integrity and optimum mechanical properties. Such impregnated strand would be especially useful for high performance and use items.

Considerable time and expense would be saved if a size composition useful for impregnating glass strands with a liquid crystal polymer resin were available which could be applied during the fiber forming process without the need for non-aqueous solvents, fluidized beds, sheaths or time-consuming manufacturing processes.

Moreover, it would be beneficial if a size composition could be employed which, when directly blended with the liquid crystal polymer resin during the glass fiber forming process, produces a substantially pure liquid crystal polymer impregnated glass strand.

SUMMARY OF THE INVENTION

According to the present invention, there is provided a glass fibrous strand impregnated with a liquid crystal polymer and a slurry composition for impregnating glass fibers which includes a liquid crystal polymer resin and a thickener material, a surfactant, and optionally, processing aids such as a coupling agent or a binder or film former material. The slurry composition includes the use of fugitive processing components together with the non-fugitive liquid crystal polymer to obtain a "prepreg" of the non-fugitive polymer. The slurry composition is applied to the glass fiber during the fiber forming operation. The slurry composition can thus be applied as a size for glass fibers during the fiber forming operation and the resulting liquid crystal polymer impregnated glass fibers can then be fabricated into glass fiber reinforced products.

According to the present invention, there is no need to first apply a sizing composition to the glass fibers and thereafter impregnate the resulting sized glass fibers with the liquid crystal polymer resin matrix in order to provide a reinforced fibrous strand. The slurry composition provides a sized glass fiber impregnated with a liquid crystal polymer resin matrix. The impregnated glass fiber is free of undesired processing materials and is therefore useful for various high performance glass reinforced end use items.

These and other aspects and advantages of the present invention will become clear after consideration is given to the detailed description of the invention which follows.

DETAILED DESCRIPTION OF THE INVENTION

The present invention relates to a glass fiber strand impregnated with a liquid crystal polymer.

The present invention further relates to a slurry composition useful for producing an improved yarn or strand (bundle of filaments) pre-impregnated with a liquid crystal polymer during the filament forming operation.

The present invention is compatible with any glass fiber conventionally utilized for the reinforcement of polymeric resins. The term "glass fibers" as used herein shall mean filaments formed by attenuation of one or more streams of molten glass and to strands formed when such glass fiber filaments are gathered together in the forming process. The term shall also mean yarns and cords formed by applying and/or twisting a multiplicity of strands together and to woven and non-woven fabrics which are formed of such glass fiber strands, yarns, or cords.

The individual components utilized in the practice of this invention are commercially available and can thus be blended with one another in the preparation of the formulation embodying the features of the present invention.

Generally, the composition of this invention may contain a carrier solvent, normally water, a thickener or rheology modifier material, and a matrix liquid crystal polymer resin powder dispersed in the sizing to form a slurry. Optionally, the slurry composition may also contain a suitable surfactant, a coupling agent or a lubricant.

The coupling agent acts in producing adhesion between the matrix resin and provide strength development and retention of the matrix resin in the slurry. One example of a suitable coupling agent is a silane such as a diamine silane (Z6020 commercially available from Dow Corning) or gamma-amino propyltriethoxysilane (commercially available from Union Carbide under the tradename "A-1100). The coupling agent can be contained in an amount of about 1.2 percent, by weight, of the slurry mixture.

Any suitable thickener material can be employed. The thickener material acts as a rheology modifier so that the liquid crystal polymer powder particles will actually adhere to the fiber. Without the thickener material the powder particles may stay behind on the rolls of the applicator while the carrier solvent goes on the fiber. The result would be a rapid build-up of powder on the applicator rolls, which in turn, rapidly causes fiber breakage.

The liquid crystal polymer resins are dispersed into the sizing in the form of fine particles, with the particle sizes ranging from about 0.5 to about 125 microns. In a preferred embodiment the size of the powder particles are less than about 125 microns. A particle size distribution containing a substantial amount of particles of about 0.5 to 2 microns (preferably about 1 micron) provides excellent uniformity and impregnation. According to the present invention the resin powders can be applied to the filaments in an amount within the range of between about 5 to about 50 percent, by weight, of the final prepreg yarn or strand. Particularly suitable liquid crystal polymers are melt spinnable, liquid crystal aromatic polyesters which are optically anisotropic in the melt phase. An example of such liquid crystal polymers are disclosed in the U.S. Pat. No. 4,600,765, which is commonly owned by the assignee, the entire disclosure of which is expressly incorporated herein to by reference.

High performance liquid crystal polymer resins exhibit advantages over thermosetting polymers when used as a matrix resin in fiber reinforced compositions. These advantages include better high strength performance and low weight.

According to the present invention the sizing composition suspends the liquid crystal polymer powder particles in the slurry. The slurry compositions of this invention are best produced by blending all materials in their liquid state with agitation. A uniform coating of the composition can be applied to the glass fibers in any suitable manner during the fiber forming process. Preferably, the compositions of the present invention are applied to the surface of the glass fiber in the manner described in U.S. Pat. No. 5,024,890 to Pollet et al. (the entire disclosure thereof being expressly incorporated herein to by reference). The resultant slurry composition is sufficiently liquid to be applied to the fibers during the fiber-forming operation. Each fiber is coated by the slurry mixture as the fibers are formed, that is, at or about the place in their formation where the conventional size compositions are typically applied (e.g., between the bushing and the spindle on which the fibers are wound as a package). In one fiber forming process, the continuous fibers leave the bushing and are dipped into the slurry and are impregnated with the slurry.

It is also within the contemplated scope of this invention that organic or inorganic particulates, such as metallic fillers useful in producing conductive rovings, may also be used with the liquid crystal polymer powder particles. These fillers can either be pre-combined with the polymer so that each powder particle contains polymer and filler or be added separately as a powder to the slurry.

The resultant impregnated strands can be chopped, either before or after drying, to be used for such operations as injection molding. Continuous impregnated strands can be filament wound or pultruded to achieve thermoplastic fiber reinforced end use items.

While the above describes the invention with sufficient particularity, the following is intended to further exemplify the present invention. The following thermoplastic slurry composition was applied to glass fibers during the fiber forming operation.

A liquid crystal polymer powder is dispersed in water. A surfactant can be added to the water to help wetting of the powder. A thickener, such as a water soluble polymer, is added to build-up the viscosity of the liquid phase. Other additives such as silane coupling agents can also be added to the aqueous suspension (also called "slurry"). This slurry is used as a size and applied to glass fibers as they are being formed.

A slurry composition suitable for producing a liquid crystal polymer pregreg has the following composition (by weight):

(1) 25 to 55 (wt. %) of liquid crystal polymer in a fine powder form. In a preferred embodiment 30 to 40 (wt. %) is preferred. The particle sizes range from approximately 0.5 microns to 125 microns. It is preferred to have powder particles which are all less than 40 microns.

(2) 0.1 to 2.0 (wt. %) of one or several suitable thickeners such as water soluble polymers such as polyethylene oxide, polyacrylamide, xanthan gum, hydroxyethylcellulose, or hydroxypropylcellulose. Polyethylene oxide is a preferred thickener as it can thermally decompose and leave almost no residue and most useful when a relatively large amount of a particular thickener is used. Polyacrylamides or modified polyacrylamides are also preferred as they are effective at very low concentrations. Although polyacrylamides are not fugitive, their low amounts have minimal effect on the liquid crystal polymer prepreg performance. The amount of a thickener is chosen so that the viscosity of the liquid phase of the water and water soluble components, excluding the liquid crystal polymer powder has a Brookfield viscosity of 10 to 2000 cps at 30 rpm. It is also desirable that the slurry exhibit a pseudo plastic behavior and possess a finite yield value so settling of the liquid crystal polymer powder is minimized. The total amount of fugitive thickener is preferably kept below approximately 4% relative to the weight of the liquid crystal polymer and the amount of non fugitive binder is preferably kept below 1% relative to the weight of the liquid crystal polymer.

(3) 0 to 0.5 (wt. %) of a suitable surfactant to help wetting of the liquid crystal polymer powder in the aqueous phase. A preferred type of surfactant is a linar alcohol/modified ethoxylate. A preferred amount is approximately 0.1%.

(4) Other ingredients such as silanes, lubricants or coupling agents may be added, if needed. If such ingredients are used, the surfactant is first dispersed in part or all of the water. The water and surfactant and the powder are then blended until homogeneous. It is preferred to first blend only part of the water until a homogeneous viscous slurry is obtained and then add the remaining of the water. The thickeners are added after the powder and the water are blended or preblended as a dry powder to the liquid crystal polymer powder prior to adding the water.

EXAMPLE: 1

Slurry Formulation (1) Blend 4.5 g Tergitol in Foam 2X (a linear alcohol/modified ethoxylate from Union Carbide) to 1800 g water;

(2) Add 1500 g liquid crystal powder (supplied as a powder of particles size less than 125 microns going through a 115 mesh sieve), blended until a homogenous slurry is obtained;

(3) Prepare a 0.5% Acrysol ASE 108 (a modified polyacrylamide) aqueous solution, adding ammonia to pH 9;

(4) Add 585 g of the 0.5% Acrysol ASE 108 solution to the above slurry, continuing stirring;

(5) Slowly add 45 g Polyox WSR N 3000 (a polyethylene oxide from Union Carbide), avoiding to form lumps, while continuing stirring;

(6) Add 525 g water and stir slowly until homogeneous and until all visible air bubbles are removed.

This slurry size was applied to glass fibers, directly in forming under the following conditions:

Glass yardage: M 450

Applicator: T 30 Amarillo-type aqueous in applicator modified with a doctor blade to control slurry thickener on applicator roll.

Doctor Blade/applicator roll gap: 25 mils.

Roll Speed: 25 ft/min.

A number of small packages were formed. If the packages were excessively dried, the powder tended to become loose from the strand. However, spraying a small amount of water on the excessively dried packages restored some of the strand/powder integrity to allow handling the strand. The liquid crystal polymer was then fused on the strand. Fusing the liquid crystal polymer on the strand may be performed in several ways. For example, the packages may be placed in an oven at a temperature above the fusing point of the liquid crystal polymer. Upon cooling, the strand is unwound from the package as needed; alternatively, the strand may be passed across a "hot finger" to achieve local fusing of the liquid crystal polymer. This step may result, as experiment demonstrated, in a flat ribbon. Another alternative is to pass the strand across a tube furnace. A nitrogen purge keeps the air out and prevents excessive oxidation. During this step some of the fugitive ingredients in the slurry decompose into volatile components.

In the second and third processes described above the strand may be kept continuous and later be used in further processes such as filament winding, pultrusion, or for making parallel tapes. The strand may also be chopped to short lengths (typically ⅛ inch to several inches) and subsequently used for molding or used as a reinforcement for liquid crystal polymers or other high temperature polymers.

Further treatments may be included, as desired, in order to eliminate fugitive size components such as a heat treatment where the typical temperature is 250° to 400° C. which "anneals" the liquid crystal polymer in order to improve the properties of the impregnated glass strand. This step may be combined with the fusing step described above.

In the slurry composition given as an example above, the liquid crystal polymer is fused on the strand by passing through a tube oven. The fused strand is then chopped to ¼ inch length. Then the chopped strands are heated at about 300° C. for about 1 hour under nitrogen. The temperature may then be brought to about 350° C. for a short time to improve strand impregnation by reflowing the liquid crystal polymer. Upon cooling the chopped prepreg is ready to be molded.

If needed, more liquid crystal polymer powder may be added to the fused strands to reach the desired resin/glass ratio. This liquid crystal polymer powder may in turn be fused against the strands to avoid segregation and obtain better handling and better impregnation.

While reference has been made to the preferred formulation in accordance with the present invention, those skilled in this art may recognize that various modifications may be made, which modifications shall accorded the broadest scope of the appended claims so as to encompass all equivalent formulations, compositions and the like.

We claim:

1. A glass strand comprised of a plurality of filaments having a coating thereon, the coating comprising a melt spinnable liquid crystal polyester resin powder which is optically anisotropic in the melt phase, wherein the coating is the dried residue formed by evaporation of water from an aqueous composition comprising, in weight percent based on the weight of the aqueous composition, about 25 to about 55 wt. % liquid crystal polyester resin powder, about 0.1 to about 2.0 wt. % thickener material, and about 0.5 wt. % surfactant.

2. The glass strand of claim 1, wherein the liquid crystal polymer resin powder has an average particle size of about 0.5 to about 125 microns.

3. The glass strand of claim 1, wherein the liquid crystal polymer resin powder has an average particle size of less than about 40 microns.

4. The glass strand of claim 1, wherein the amount of the liquid crystal polymer resin powder in the aqueous composition ranges from about 30 to about 40 weight percent.

5. The glass strand of claim 1, wherein the liquid crystal polymer resin powder impregnated in the glass strand ranges from about 5 to about 50 percent, by weight, based on the weight of the glass strand.

* * * * *